United States Patent [19]

Hirayama et al.

[11] Patent Number: 4,639,549
[45] Date of Patent: Jan. 27, 1987

[54] CORDLESS TELEPHONE

[75] Inventors: Shoji Hirayama, Kanagawa; Mitsuharu Inada, Tokyo, both of Japan

[73] Assignee: Sony Corporation, Tokyo, Japan

[21] Appl. No.: 696,183

[22] Filed: Jan. 29, 1985

[30] Foreign Application Priority Data

Jan. 31, 1984 [JP] Japan .................................. 59-15451
Feb. 8, 1984 [JP] Japan .................................. 59-21259

[51] Int. Cl.$^4$ ............................................. H04Q 7/04
[52] U.S. Cl. ........................................ 379/62; 455/88
[58] Field of Search ................. 179/2 E, 2 EA, 2 ER; 455/88

[56] References Cited

U.S. PATENT DOCUMENTS 4,535,200 8/1985 Himmelbauer et al. ......... 179/2 EA
4,593,155 6/1986 Hawkins ........................... 179/2 EA Primary Examiner—Robert G. Lev
Attorney, Agent, or Firm—Lewis H. Eslinger; Alvin Sinderbrand

[57] ABSTRACT

A cordless telephone utilizes internally generated identifying codes to reduce crosstalk and the risk of wiretapping. When the handset unit is mounted on the base unit, a new identifying code is automatically generated and stored in the base unit, and then transmitted to the handset unit, which also stores it. When an incoming or outgoing telephone call is initiated, the two identifying codes stored in the base unit and the handset, respectively, are compared and, if they are not identical, the telephone call is cut off. Advantageously the identifying codes are randomly generated.

18 Claims, 10 Drawing Figures

CORDLESS TELEPHONE

FIELD OF THE INVENTION

The present invention relates generally to cordless telephones, and in particular relates to a cordless telephone system using identification code signals for establishing a communication channel.

BACKGROUND OF THE INVENTION

The standard telephone consists of a base unit and a handset unit connected to each other by an electrical cord. The base unit itself is connected by another cord to a receptacle on a wall, telephone pole or a similar immovable structure to which the telephone network line and extends. Therefore, the range of movement of the operator of the telephone is quite limited. Even when the cords connecting the handset unit to the base unit and the base unit to the wall are long, it can be cumbersome to move either the entire telephone around to make calls from different locations or to walk around with the handset unit once a call has been placed. The simple fact that there is always a continuous physical connection between the person making the phone call and the immovable wall on other fixed structure can be a great inconvenience.

The cordless telephone represents a significant improvement over the standard telephone. In the conventional cordless telephone, the base unit is still connected to the immovable receptacle on the wall or the like by a cord so that message signals from the telephone network line may be received and transmitted. However, the handset unit of the cordless telephone is an independently operative unit from which calls may be made and by which calls may be received, with no physical connection to the base unit. Instead, the base unit and the handset unit of the cordless telephone communicate with each other over a communication channel established by the transmission and reception of electromagnetic waves, conventionally radio waves. The handset unit may then be taken to distances of up to 300 feet from the base unit, while still making and receiving telephone calls. Since the base unit is not attached to any fixed power supply, it is generally powered by batteries.

The cordless telephone itself presents certain difficulties. In particular, if several cordless telephones are being used within the same general area, the signal transmitted from one handset unit to its own base unit may be picked up by the base unit of a completely different cordless telephone, leading to crosstalk interference. A second, more sophisticated, difficulty is that, since the radio waves establishing the communication channel between the handset unit and the base unit may be received by any appropriately located antenna, it is possible to "wiretap" the cordless telephone, so that a third party can listen in on or intercept conversations. Under many circumstances, this is highly undesirable. The term "wiretap" is some what incongruous in this situation, since there is no physical wire to be tapped, but this term is customarily used for any act of listening in on, or intercepting other people's telephone conversations, and the present specification will use the term "wiretap" in that sense, that is, to mean the unauthorized listening in on telephone conversations through the reception of the radio waves transmitted between the handset unit and the base unit of a cordless telephone.

To overcome these problems, two systems have been proposed. In the first system, mechanical switches for selecting a code number as an arbitrary combination of four digits, from "0000" to "9999", are provided on both the handset unit and the base unit. These switches are manually set by the operator of the telephone set. If both sets of switches are set to the same code number, the communication channel can be established and telephone messages transmitted. If, however, the switches are set to different code numbers, means are provided within the base unit for cutting off the communication channel. The radio waves transmitted between the handset unit and the base unit include this identifying code information. By this means, interference between one telephone set and any other cordless telephone sets operating in the general neighborhood can be avoided and the possibility of wiretapping can be reduced. However, this system requires four manually actuable switches on each of the handset unit and base unit, which inevitably increases the manufacturing cost. Furthermore, the switches are placed so as to be easily operable from the surfaces of the units. As a result, it is quite likely that the operator may inadvertently change the code number of the handset unit by actuating one of the switches without realizing it. When the code number of the handset unit is thereby different from that of the base unit, communication between the two units is prevented. This difficulty can be removed by resetting the code numbers of both the handset unit and the base unit, but this requires the operator to walk back to the base unit, which is the very thing that a cordless telephone set is supposed to avoid.

A second system for overcoming the wiretapping and interference problems, proposed by a person or persons having an obligation of assignment to the assignee of the present invention, is to have a memory within each of the handset unit and the base unit and to store identifying code therein. When the operator wants to make an outgoing call, the identifying code is transmitted from the handset unit to the base unit over the communication channel created by the radio waves. The base unit contains means for checking whether the received identifying code is the same as the identifying code stored in its own memory. If the two are the same, the communication channel is kept open and the telephone call proceeds. If not, the communication channel is cut off. Similarly, if an incoming call is received by the base unit over the telephone network line, the base unit transmits its stored identifying code to the handset unit, which in turn compares the received identifying with the identifying code number stored in its own memory. Again, only if the two identification codes are the same is the communication channel kept open.

However, once again this presents difficulties. As earlier noted, the handset unit must contain its own power supply, and to keep it ready to receive an incoming call a a certain power drain will always be present. If the power supply is a dry cell battery, it will be quickly discharged, so that there is the significant inconvenience of frequently replacing the battery, not to mention the additional cost.

If, on the other hand, a rechargeable battery is used, such as an Ni-Cd alkaline battery, it may be recharged by mounting the handset unit on the base unit. During the period of recharging, there needs to be some backup for the memory that stores the identifying code. This may be accomplished by either a backup battery or a backup nonvolatile memory. If a backup battery is used, it must be quite powerful, since the period for recharging the battery is not constant. The handset is then large and heavy. Conversely, if a backup memory is used, the entire system becomes more complicated and requires a much greater manufacturing cost.

A third difficulty is that if a third party should ever learn the particular code number stored in the memories of a particular telephone set, that telephone set may be easily wiretapped. Since there is no provision for changing the code numbers, either the telephone set must be replaced or it will continue to be susceptible to being wiretapped.

OBJECTS AND SUMMARY OF THE INVENTION

Accordingly, it is an object of the present invention to provide an improved cordless telephone which eliminates the difficulties of the prior art.

It is another object of the present invention to provide a cordless telephone which greatly reduces the possibility of wiretapping by a third party.

It is another object of the present invention to provide a cordless telephone which is small and lightweight and of reduced manufacturing cost.

In accordance with an important aspect of the present invention, there is provided a cordless telephone comprising a base unit connectable to a telephone network line for receiving and transmitting message signals therethrough, a handset unit selectively mountable upon and separable from the base unit, the base unit and the handset unit being adapted to preliminarily open and establish a communication channel therebetween by the transmission and reception of electromagnetic waves. The base unit includes identifying code generating means for automatically generating one of a plurality of identifying codes upon the mounting of the handset unit upon the base unit, first memory means for storing the generated identifying code and means for initially transmitting the generated identifying code over the communication channel to the handset unit mounted thereupon, and the handset unit includes second memory means for storing the generated identifying code initially transmitted thereto. Additionally, at least one of the base and handset units includes means for transmitting over the communication channel to the other of the units the identifying code stored within the memory means of that one unit when the communication channel is preliminary opened, and the other unit includes means for detecting when the transmitted identifying code is identical to the identifying code stored in the memory means of the other unit and for establishing the communication channel only when identity is detected.

In a preferred embodiment of a cordless telephone according to the present invention, the identifying code generating means includes a random number generating means so that the one of the plurality of possible identifying codes is randomly generated. In the preferred cordless telephone according to the present invention, a new identifying code is generated and stored in both the handset unit and the base unit unit whenever the handset unit is returned to or mounted on the base unit. The identifying code can thus be frequently changed, so that it is virtually impossible for a third party to know the correct identifying code at any given time. Furthermore, since identifying codes are used, interference crosstalk is eliminated.

These and other objects, features and advantages of the cordless telephone according to the present invention will become apparent from the following detailed description of the preferred embodiments taken in conjunction with the accompanying drawings, throughout which like reference numerals designate like elements and parts.

DESCRIPTION OF THE PREFERRED EMBODIMENTS

Figure 1:
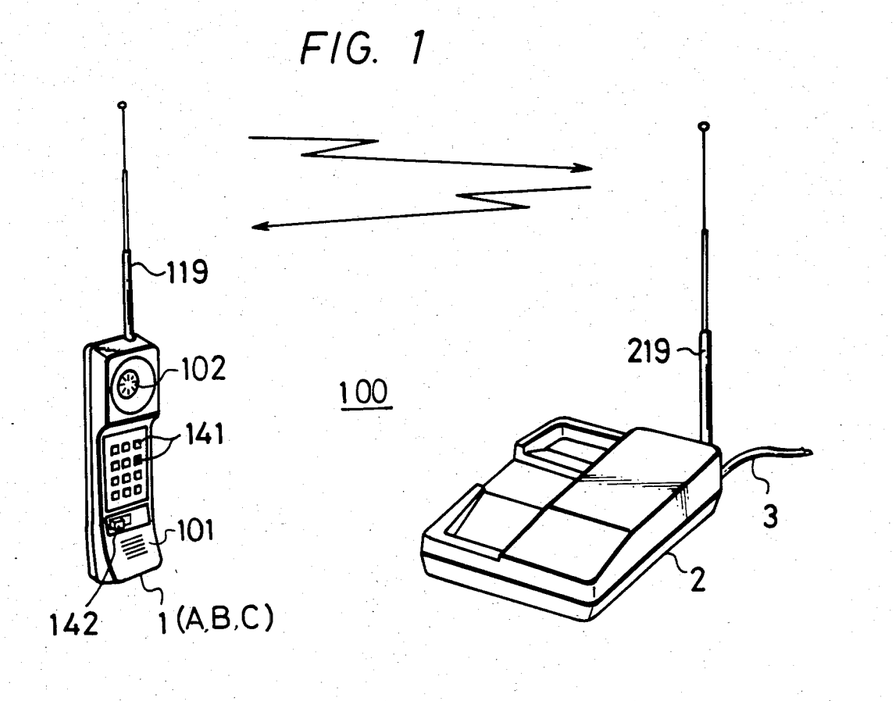
FIG. 1 is a perspective view of a cordless telephone according to the present invention, illustrating the handset unit separate from the base unit.
Figure 2:
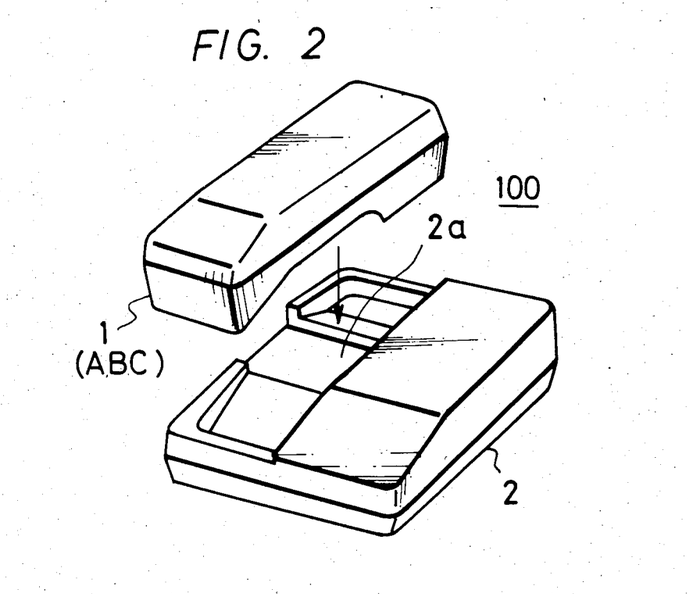
FIG. 2 is a perspective view of the cordless telephone according to the present invention, illustrating the handset unit being mounted upon the base unit.

Referring to the drawings in detail, and initially to FIGS. 1 and 2 thereof, a cordless telephone 100 according to the present invention is shown to include a handset unit 1 and a base unit 2. Base unit 2 is connected by a telephone cord 3 to an outlet or receptacle in a wall, a telephone pole, or another fixed structure, so that it may both receive and transmit telephone message signals through a telephone network line and also may be powered thereby. An antenna 119 on handset unit 1 and a corresponding antenna 219 on base unit 2 are used to create the communication channel between the two units by the transmission and reception of radio waves, schematically illustrated in FIG. 1 by the arrows extending between the antennas. As is conventional, handset unit 1 includes a ten-key panel 141 for making or dialing outgoing calls, a mouthpiece 101 and an earpiece 102. Handset unit 1 also includes a talk button 142 which has a standby position in which telephone 100 is enabled to receive an incoming call but is not in present use, and an ON position in which a telephone call may be made. With talk button 142 in its ON position, a telephone number may be entered on ten-key panel 141, and corresponding information is transmitted over the communication channel to base unit 2 and thence to the telephone network line. Alternatively, with talk button 142 in the standby position, when base unit 2 receives a message signal from the telephone network line indicating that an incoming call is present, a bell in the handset unit 1 rings to indicate the existence of the incoming call. The operator may then place talk button 142 in the ON position to receive the call. The complete operation of the cordless telephone accordingly to the present invention in accomplishing these functions will be discussed in greater detail below.

Since handset unit 1 is not connected to a power line, it must contain its own power supply, which is advantageously a rechargeable battery. The battery is recharged by mounting handset unit 1 on a mounting portion 2a of base unit 2, as illustrated in FIG. 2. Handset unit 1 and base unit 2 have matching electrical contacts through which power may be supplied to handset unit 1 to recharge the battery. It is when handset unit 1 is thus mounted on base unit 2 to recharge the battery that the identifying code is automatically generated and stored in the memories contained within handset unit 1 and base unit 2. Even when the battery is charged, however, handset unit 1 may be mounted on base unit 2 purely for the purpose of resetting the identifying code.

Figures 3, 3A:
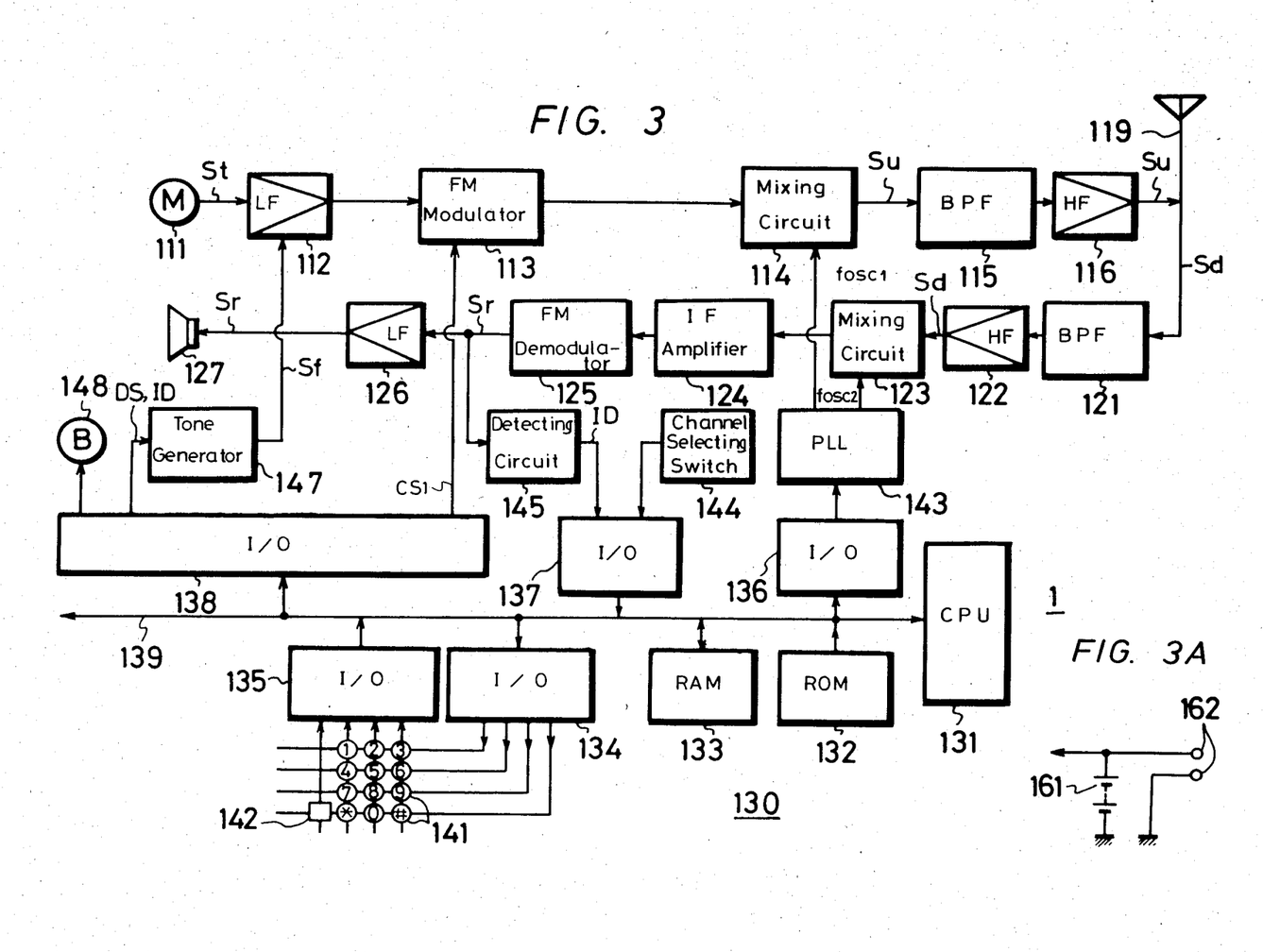
FIG. 3 is a block diagram of a portion of the circuitry of the handset unit of FIG. 1.
FIG. 3A is a circuit diagram of another portion of the circuitry of the handset unit of FIG. 1.
Figures 4, 4A:
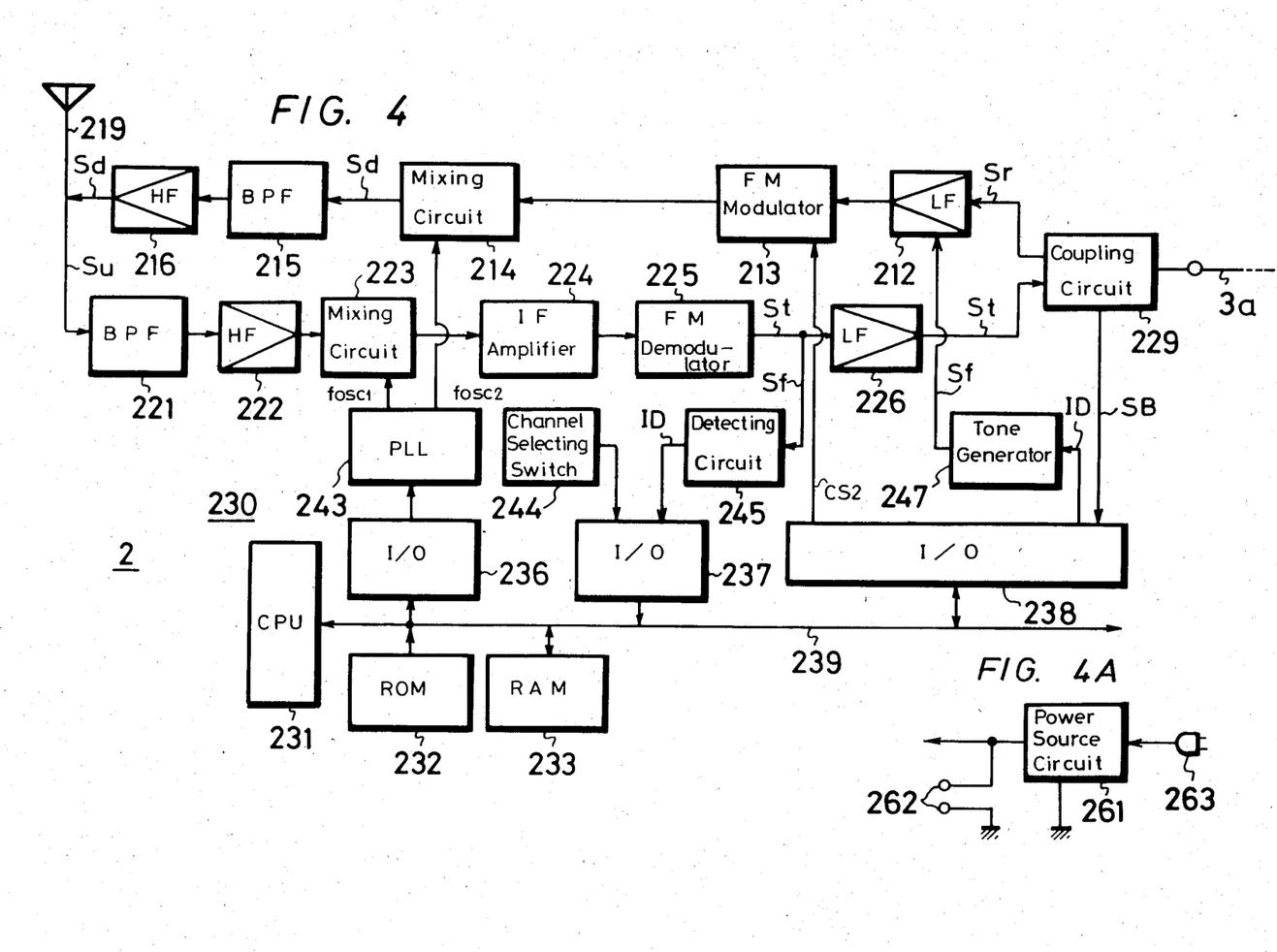
FIG. 4 is a block diagram of a portion of the circuitry of the base unit of FIG. 1.
FIG. 4A is a schematic diagram of another portion of the circuitry of the base unit of FIG. 1.

Referring now to FIGS. 3 and 4, important portions of the circuitry contained within handset unit 1 and base unit 2, respectively are therein illustrated. It should be noted that the circuitry within these two units contains many corresponding elements, so that the two figures and their accompanying description should be considered together.

Handset unit 1 (FIG. 3) includes a transmission system, indicated by elements bearing reference numerals 112 to 116, and a receiving system, indicated by elements bearing reference numerals 121 to 126. Base unit 2 (FIG. 4) similarly includes a transmission system, indicated by elements bearing reference numerals 212 to 216, and a receiving system, indicated by elements bearing reference numerals 221 to 226. For a better understanding of the present invention, the function and operation of these elements will be described as signals are transmitted between the two units.

Therefore, for the transmission of a signal from handset unit 1 (FIG. 3), an audio signal St from a microphone 111 contained within mouthpiece 101 of handset unit 1 is supplied through a low frequency amplifier 112 to an FM modulating circuit 113, which outputs a corresponding FM modulated intermediate frequency signal. This signal is supplied to a mixing circuit 114, which also receives a first local oscillation signal $fosc_1$ from a phase-locked loop (PLL) circuit 143. Mixing circuit 114 frequency converts the FM intermediate frequency signal to an FM signal Su occupying a predetermined upper channel which is one of a plurality of upper channels available in cordless telephone 100. Signal Su is supplied through a band pass filter 115 with a pass band including this upper channel and then through a high frequency amplifier 116 to antenna 119, by which it is transmitted as a radio frequency wave to base unit 2 over the communication channel.

Referring now to FIG. 4, signal Su transmitted from handset unit 1 is received at base unit 2 by antenna 219 and is supplied through a band pass filter 221 and a high frequency amplifier 222 to a mixing circuit 223. Mixing circuit 223 receives the same frequency first local oscillation signal $fosc_1$ from a phase-locked loop circuit (PLL) 243 to frequency convert the signal Su back to the FM intermediate frequency signal. This FM signal is supplied through an intermediate frequency amplifier 224 to an FM demodulating circuit 225, wherein it is demodulated to an audio signal St. Audio signal St is passed through a low frequency amplifier 226 and a coupling circuit 229 to the telephone network line 3a. Thus, outgoing message signals from handset unit 1 are transmitted to base unit 2 and thence to the telephone network line.

The transmission of signals from base unit 2 to handset unit 1 will now be described. When incoming message signals are received from the telephone network line 3a, coupling circuit 229 transforms the message signal to an audio signal Sr, as is conventional, and supplies audio signal Sr through a low frequency amplifier 212 to an FM modulating circuit 213, which outputs a corresponding FM intermediate frequency signal. This FM signal is supplied to a mixing circuit 214, which is supplied with a second local oscillation signal $fosc_2$ from PLL 243 to frequency convert the FM signal to an FM signal Sd occupying a selected lower channel corresponding to the upper channel of FM signal Su. Signal Sd is supplied through a band pass filter 215 with a pass band including the lower channel and then through a high frequency amplifier 216 to antenna 219, by which it is transmitted to handset 1 over the communication channel.

Referring back to FIG. 3, signal Sd transmitted from base unit 2 is received by antenna 119 and is supplied through a band pass filter 121 with a pass band including the lower channel and then through a high frequency amplifier 122 to a mixing circuit 123. Again, mixing circuit 123 is supplied with the second local oscillation signal $fosc_2$ from PLL circuit 143, so that signal Sd is frequency converted to the FM intermediate frequency signal. This FM signal is supplied through an intermediate frequency amplifier 124 to an FM demodulating circuit 125, wherein it is demodulated to the audio signal Sr and supplied through a low frequency amplifier 126 to a loudspeaker 127 contained within earpiece 101 of handset unit 1.

In accordance with an important aspect of the present invention, handset unit 1 further contains a control circuit, generally designated by reference numeral 130 in FIG. 3, and base unit 2 similarly contains a control circuit, generally indicated by reference numeral 230 in FIG. 4. These control circuits may each advantageously be comprised in great part by a microprocessor or microcomputer, contained on a single integrated circuit. Control circuit 130 includes a central processing unit (CPU) 131, which may be adapted for high speed processing of eight bit data, a read only memory (ROM) 132, which stores control programs for controlling the operation of central processing unit 131, a random access memory (RAM) 133 serving as a work and storage area, and input/output (I/O) ports 134 to 138. A system bus 139 interconnects elements 132 to 138 with CPU 131.

Similarly in base unit 2, control circuit 230 includes a CPU 231, ROM 232, RAM 233, I/O ports 236 to 238 and system bus 239, each performing a function corresponding to that of the element of control circuit 130 having the same two final digits in the reference numeral. A detailed description is given below of the operation and control of each of these elements, but it should be understood that a control circuit such as control circuits 130 and 230 may, under the control of an appropriate control program, be designed to perform different functions at different times and to control the operation of several elements. At each stage of operation of the control circuit by the control program, the control circuit may be viewed as a means for performing a certain function. For instance, according to an aspect of the present invention, two identifying codes are compared for identity to establish the communication channel, and at such time control circuits 130, 230 may be regarded as means for detecting this identity. Similarly, in accordance with another aspect of the Cpresent invention, a new identifying code is generated and stored when handset unit 1 is mounted on base unit 2. At such time, control circuits 130, 230 may be regarded as means for automatically generating and storing an identifying code. The discussion below will make clear at all times what functions control circuits 130 and 230 are performing and precisely how such functions are carried out.

On handset unit 1 (FIG. 3), ten-key panel 141 for entering the telephone number and talk button 142 are connected to I/O ports 134 and 135 to be dynamically scanned by I/O port 134, so that actuation of talk button 142 or any of the keys is detected by I/O port 135.

I/O port 136 is connected between PLL circuit 143 and system bus 139, and I/O port 137 is connected between system bus 139 and a channel selecting switch 144. As stated above, several upper and lower channels are available. Channel selecting switch 144 is used to select the desired upper and lower channels by specifying the frequency dividing ratio of a variable frequency dividing circuit contained within PLL circuit 143. This determines the frequencies of local oscillation signals $fosc_1$ and $fosc_2$ supplied from PLL circuit 143 to mixing circuits 114 and 123, respectively.

A detecting circuit 145 is connected between the output of FM demodulator 125 and I/O port 137 for receiving signal Sr. Detecting circuit 145 is operative to derive the identifying code ID which has been received from base unit 2. Identifying code ID is supplied through I/O port 137 to CPU 131 for analysis, as will be described below.

I/O port 138 is connected between system bus 139 and a tone generator 147. The identifying code ID from CPU 131 may be transmitted via I/O port 138 to tone generator 147 for conversion from a digital signal to an analog signal in the audio frequency band. Advantageously, this analog signal may be a frequency shift key (FSK) signal Sf. A dial signal DS generated by CPU 131 upon the dialing of a desired telephone number on ten key panel 141 may similarly be converted to the audio frequency signal Sf. Signal Sf, containing one or both of these components ID and DS, is supplied to low frequency amplifier 112. In the manner discussed above, these audio frequency signals are supplied from amplifier 112 to antenna 119 for transmission to base unit 2.

I/O port 138 is also connected to a bell 148. When handset unit 1 receives the signal from base unit 2 that an incoming call is present, and talk button 142 is in it standby position, bell 148 is caused to ring to announce the incoming call.

According to an important aspect of the present invention, a control signal $CS_1$ generated under the control of the CPU 131 through I/O port 138 is supplied to FM modulator 113. In response to the character of control signal $CS_1$, FM modulator 113 will either transmit or cut off its output FM signal. When FM modulator 113 is enabled to transmit after the communication channel is preliminarily opened by the actuation of talk button 142 and the detection of identity between the identifying codes stored in handset unit 1 and base unit 2, as discussed in greater detail below, the communication channel is established, that is, it remains open to transmit the telephone call. If FM modulator 113 is disabled in response to control signal $CS_1$, the communication channel is prevented from being established. As will be discussed in greater detail below, this feature virtually eliminates the possibility of wiretapping.

A rechargeable battery 161 (FIG. 3A) is provided as the power source for handset 1. The output voltage of rechargeable battery of 161 is applied as a power supply voltage to the necessary circuit elements, as is conventional. Rechargeable battery 161 has charging terminals 162 through which it may be charged when handset unit 1 is mounted on base unit 2.

Referring now to FIG. 4, base unit 2 contains many elements having functions similar or identical to those of elements in handset unit 1. Control circuit 230 is similar to control circuit 130 of handset unit 1 and performs similar functions. Importantly, control circuit 230 provides means for detecting when the identifying codes stored in handset unit 1 and base unit 2 are or are not identical and for supplying a control signal $CS_2$ to FM modulator 213 to establish or cut off transmission, respectively. Elements bearing reference numerals from 231 to 247 correspond to elements of handset unit 1 bearing reference numerals 131 to 147, respectively, and a detailed description of the operation of these elements will not be herein described in the interest of brevity. Of course, control circuit 230 does not control a ten keypanel, a talk button or a bell, since these elements do not exist in base unit 2. However, I/O port 238 is connected between coupling circuit 229 and system bus 239 for transmitting a signal SB from telephone network line 3a to indicate an incoming call and control circuit 230 controls this function.

Figure 5:
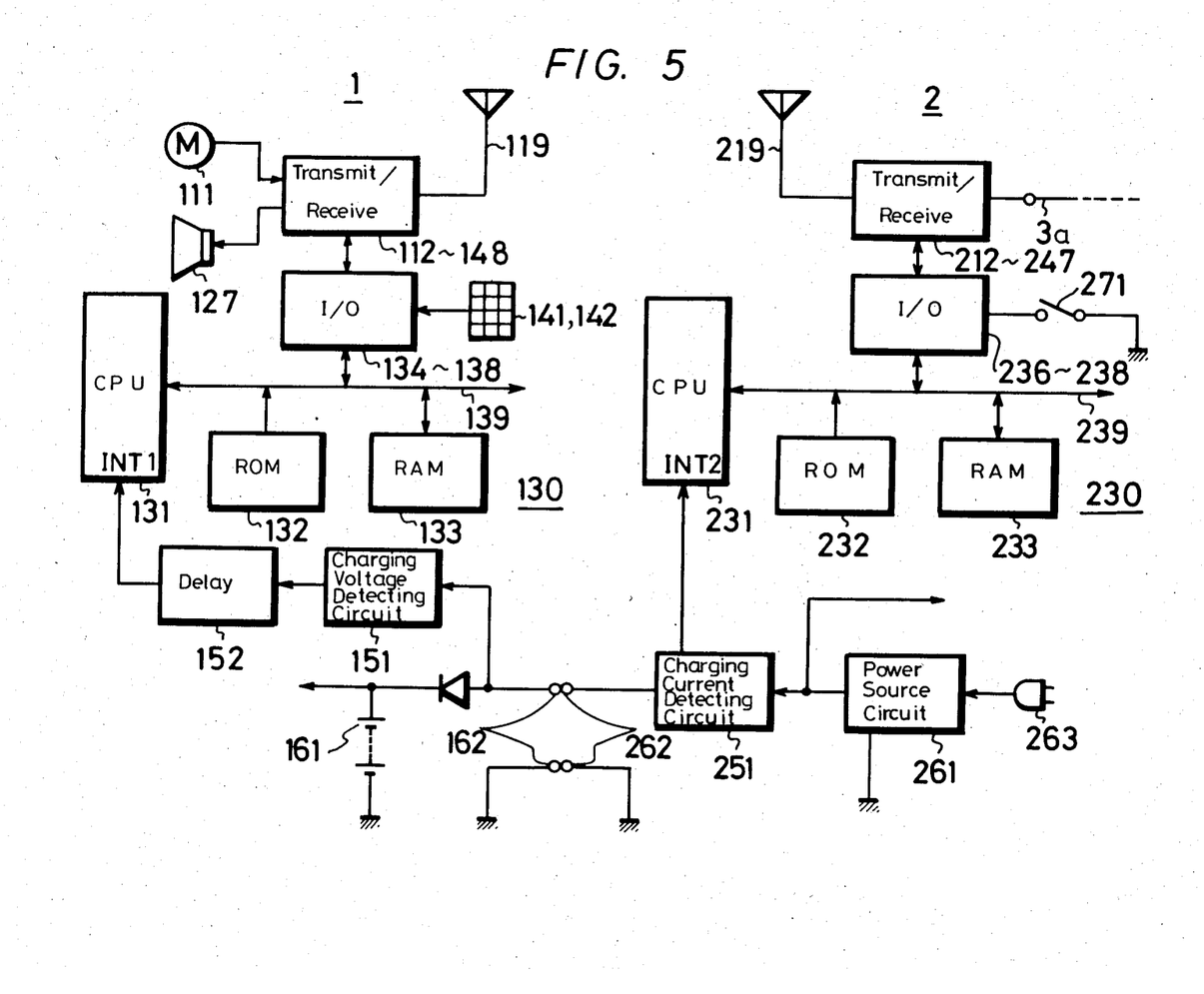
FIG. 5 is a block diagram of the combined circuitry of the handset and base units.

FIG. 4A illustrates a power source circuit 261 of base unit 2 which is connected via a plug 263 to a conventional ac power line through a wall outlet. Power source circuit 261 operates in a known manner to convert the ac signal to a DC power supply voltage, which is supplied to the necessary elements as the power supply voltage. Charging terminals 262 are provided on power source circuit 261 so that they electrically contact terminals 162 of handset 1 when handset 1 is mounted on base unit 2, for changing battery 161 (FIG. 5).

In order to make or receive a telephone call, channel selecting switches 144 and 244 (FIGS. 3 and 4) of handset 1 and base unit 2, respectively, are set to the same channel. The operation of cordless telephone 100 is carried out by CPUs 131 and 231 under the control of control programs stored in ROMs 132 and 232, respectively. To make an outgoing call, talk button 142 is placed in its ON position. This is detected through the scanning operation of I/O ports 134 and 135, and an indication thereof is sent to CPU 131 over system bus 139. CPU 131 reads an identifying code $ID_1$ from RAM 133 which had been previously generated and stored during an operation which will be described in detail below. Identifying code $ID_1$ is supplied through I/O port 138 to tone generator 147, which converts it to FSK signal Sf. Signal Sf is supplied to amplifier 112 and then to FM modulator 113. Initially, FM modulator 113 is enabled to transmit signals, so that identifying code $ID_1$ is transmitted to the base unit 2 through FM signal Su over the preliminarily opened communication channel. When signal Su is received in the base unit 2, signal Sf is derived in demodulating circuit 225 and supplied to detecting circuit 245, which derives identifying code $ID_1$. Identifying code $ID_1$ is passed through I/O port 237 to CPU 231. CPU 231 then reads an identifying code $ID_2$ stored in RAM 233 and determines whether or not the two identifying codes $ID_1$ and $ID_2$ are identical. If they are not identical, which usually would mean that the telephone call is being made by a handset of a different telephone, FM modulating circuit 213 is disabled in response to control signal $CS_2$, so that further signal transmission is cutoff and cordless telephone 100 remains in the standby mode. On the other hand, if identification codes $ID_1$ and $ID_2$ are identical, FM modulating circuit 213 is enabled to transmit the FM signal and establish the communication channel. A dial tone will be generated in handset unit 1, and, upon operation of ten-key panel 141, a dial signal DS corresponding to the telephone number being called is generated in CPU 131 and supplied to tone generator 147 for conversion to FSK signal Sf and subsequent transmission to base unit 2.

Then in base unit 2 signal Sf is derived in demodulating circuit 225 and supplied through amplifier 226 and coupler 229 to telephone network line 3a. The subsequent operation of the telephone in transmitting and receiving the telephone message signals is as described above and the description will not be repeated.

The operation of the cordless telephone according to the present invention when an incoming call is received will now be described. The incoming message signal on telephone network line 3a is received at coupling circuit 229 which supplies incoming call signal SB to I/O port 238 and thence to CPU 231 of base unit 2 (FIG. 4). As a consequence, identifying code $ID_2$ stored in RAM 233 is supplied through I/O port 238 to tone generator 247, wherein it is converted to signal Sf and supplied to low frequency amplifier 212. At this time, modulating circuit 213 is enabled by control signal $CS_2$, so that identifying code $ID_2$ is transmitted via FM signal Sd to handset unit 1. Under these circumstances, of course, talk button 142 is in its standby mode, since an outgoing call is not being made.

In handset unit 1 (FIG. 3), signal Sd is received and signal Sr is derived therefrom in demodulating circuit 125. Identifying code $ID_2$ is subsequently derived in detecting circuit 145. Under the control of CPU 131, as will be described below, the identity between received identifying code $ID_2$ and stored identifying code $ID_1$ from RAM 133 is checked. If they are not identical, control signal $CS_1$, disables FM modulator 113 and talk button 142 remains in the standby position. If the two identifying codes are identical, FM modulating circuit 113 remains enabled and the communication channel is established. Bell 148 sounds to announce the incoming call, that is, cordless telephone 100 rings. Thereafter, talk button 142 is placed in its ON position, bell 148 stops ringing and handset unit 1 receives the call.

The circuitry for automatically generating and storing the selected one of the plurality of identifying codes is illustrated in FIG. 5 which shows many of the elements of handset unit 1 and base unit 2 described with reference to FIGS. 3 and 4. Additional elements and their connections are illustrated in FIG. 5 to further define cordless telephone 100.

FIG. 5 illustrates cordless telephone 100 when handset unit 1 is mounted on base unit 2. Charging terminals 162 of handset unit 1 and charging terminals 262 of base unit 2 are in electrical contact. In base unit 2, a charging current detecting circuit 251 is provided in the path between power source circuit 261 and the hot terminal of charging terminals 262. Charging current detecting circuit 251 detects the current flowing through charging terminals 262 when handset unit 1 is mounted on base unit 2 and provides an interrupt signal to CPU 231 at an interrupt input INT2. CPU 231 is responsive to the receipt of this interrupt signal to retrieve an interrupt subroutine 20 from ROM 232 and to execute the steps thereof. Interrupt subroutine 20 will be discussed in greater detail below in connection with FIG. 6.

Correspondingly, in handset unit 1, a charging voltage detecting circuit 151 is connected to the hot terminal of charging terminals 162 in parallel with rechargeable battery 161 to detect the application of the supply voltage from power source 261 when handset unit 1 is mounted on base unit 2. An interrupt signal generated in response thereto is supplied from charging voltage detecting circuit 151 through a delay circuit 152 to an interrupt input INT1 of CPU 131. CPU 131 is responsive to this interrupt signal to retrieve an interrupt subroutine 10 from ROM 132 and to execute the steps thereof. Delay circuit 152 is provided so that the rechargeable battery 161 has sufficient charging time to stabilize its terminal voltage and thereby allow the various sections of handset unit 1 to operate in a normal condition.

Figure 6:
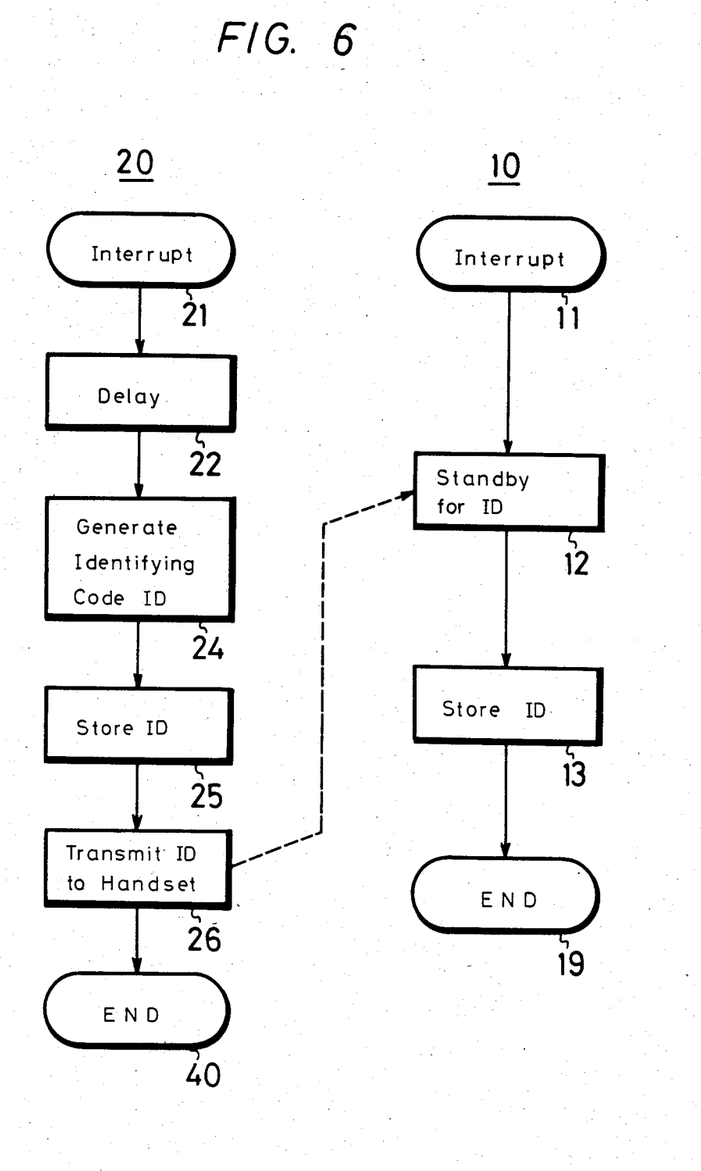
FIG. 6 is a flowchart of a first control program for the operation of a first embodiment of the present invention.

Turning to FIG. 6, the operation of the cordless telephone 100 under the control of CPUs 131 and 231 will now be described. Both interrupt subroutines 10 and 20 begin with an interrupt step 11 and 21, respectively, upon the receipt of the respective interrupt signals from charging voltage detecting circuit 151 and charging current detecting circuit 251. In base unit 2, CPU 231, following subroutine 20, proceeds from interrupt step 21 to a delay step 22. The delay time at step 22 is slightly longer than that of delay circuit 152, so that by the time step 22 is completed, the voltage at terminals 162 is stable, and handset 1 is operating normally. Next, CPU 231 advances to step 24, wherein a new identifying code ID is generated. Advantageously, the new identifying code ID is randomly generated in accordance with a random number from a random number generator within CPU 231. By randomly generating the new identifying code ID, the possibility of wiretapping or interfering crosstalk is minimized. Since the generation of the new identifying code ID id not in response to external selection criteria, there is no way to anticipate what the new identifying code ID will be.

CPU 231 next advances to step 25, wherein the newly generated identifying code ID is stored in RAM 233 as identifying code $ID_2$. In step 26, the new identifying code ID is transmitted to handset 1 in the same way as the identifying code $ID_2$ is transmitted upon the receipt of an incoming phone call, as described in connection with FIGS. 3 and 4, i.e. the identifying code ID is converted to the FSK signal Sf and then transmitted over the communication channel. Previous delay step 22 has ensured that the new identifying code ID will not be transmitted before handset unit 1 is ready to receive it. CPU 231 ends interrupt subroutine 20 at step 40.

Meanwhile, in handset 1, the interrupt signal, generated when the power supply voltage from terminal 162 is detected by charging voltage detecting circuit 151, is supplied to delay circuit 152. Since the delay time of delay circuit 152 is specifically chosen to be long enough to enable the DC voltage to stabilize, a delayed interrupt signal is produced only after handset unit 1 has resumed normal operation. When CPU 131 receives the delayed interrupt signal, it begins interrupt subroutine 10 with interrupt step 11 and then proceeds to step 12, wherein handset unit 1 is placed in a standby mode to await the generation and transmission of the new identifying code signal ID from base unit 2. When the identifying code ID has been received, CPU 131 proceeds to step 13, where the new identifying code ID is stored in RAM 133 as identifying code $ID_1$. CPU 131 ends interrupt subroutine 10 at step 19.

Thus, in accordance with the present invention, neither a backup battery nor a backup memory for RAM 133 are required, as would be necessary in the previously proposed systems. The prior art mechanical code selecting switches for setting the identifying code ID are similarly not required. Furthermore, the circuitry required in circuits 151, 152 and 251 is very simple and control circuits 130,230 may be advantageously embodied in microprocessors suitably programmed in accordance with the flow chart of FIG 6. Thus, the cordless telephone according to the present invention may be produced at a low manufacturing cost and without complex circuitry. Furthermore, since a backup battery and complex circuitry are not required, the cordless telephone may be small and lightweight.

Another highly advantageous feature of the present invention is that the new identifying code ID is transmitted from base unit 2 to handset unit 1 over the communication channel. It is therefore not necessary to provide a signal line and terminals for electrically transmitting the new identification code ID between the two units. Once again, this results in a significantly reduced manufacturing cost.

Since the new identifying code is updated automatically whenever handset unit 1 is mounted on base unit 2, there is no need for the operator to remember or keep a written record of the current identifying code. Such a written record could be stolen. Also, there is no way to inadvertently reset or change the identifying code on handset unit 1 alone, as was possible with the prior art mechanical switches. If for any reason the identifying code needs to be reset, handset unit 1 is merely returned or mounted on base unit 2. The cordless telephone according to the present invention may be used immediately after the charging is complete.

Even if a third party should discover the current identifying code, the identifying code may be changed so easily and rapidly that the cordless telephone according to the present invention is virtually safe from wiretapping. Thus, the cordless telephone according to the present invention provides many new and highly advantageous features not previously known or available. It is at once more convenient to use and more sophisticated in the prevention of wiretapping.

In a second preferred embodiment, two or more handset units 1A, 1B, and 1C may be used in connection with a single base unit 2. In that case, it is desirable to ensure that, whenever the identifying code in base unit 2 is changed, for example when handset 1A is mounted thereon, the remaining handsets 1B and 1C do not become inoperative. In other words, it is necessary to provide means whereby all three handsets 1A, 1B and 1C may have their identifying codes changed to the same one stored in the base unit 2. To this end, a switch 271 is provided in connection with I/O port 238 (FIG. 5). If switch 271 is in its off position, and a first handset unit, for instance handset unit 1A, is mounted on base unit 2, the charging of the battery in handset unit 1A and the generation and storing of the new identifying codes $ID_{1A}$ and $ID_2$ proceeds in the manner described above. Thereafter, and before the next handset unit 1B is mounted on base unit 2, switch 271 is moved to its on position. In the on position, switch 271 inhibits the generation of a new identifying code, while permitting the recharging of the battery and the transmission of the identifying code $ID_2$ stored in base unit 2. Similarly, switch 271 is kept in its on position while handset unit 1C is mounted on base unit 2.

Figure 7:
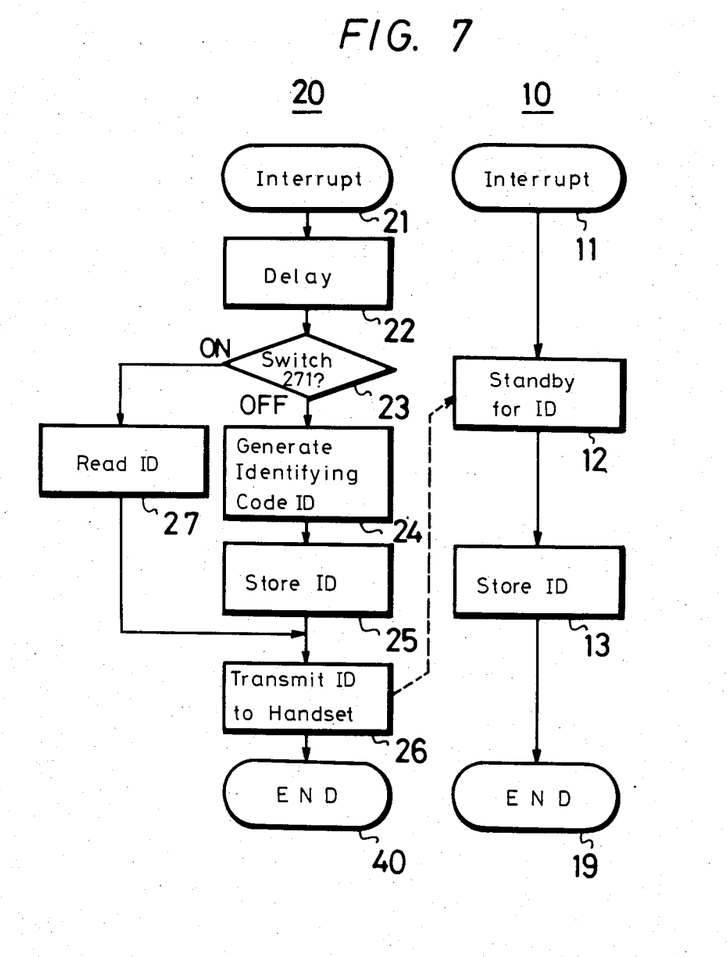
FIG. 7 is a flowchart of a second control program for the operation of a second embodiment of the present invention.

A flowchart of the operation of this embodiment of cordless telephone 100 having plural handsets is illustrated in FIG. 7, wherein steps identical to those in FIG. 6 are given like reference numerals. In FIG. 7, a step 23 has been inserted between steps 22 and 24, and a step 27 has been inserted between step 23 and step 26. After CPU 231 has waited for the predetermined time in step 22, it proceeds to step 23, wherein it is determined whether switch 271 is on or off. If it is off, implying that the first handset unit 1A has been mounted, the processing proceeds as described above. A new identifying code is generated, stored in base unit 2 as $ID_2$, and transmitted.

On the other hand, if switch 271 is on, implying that handset unit 1B or 1C has been mounted, CPU 231 proceeds to step 27, wherein the identifying code $ID_2$ is read from RAM 233. CPU 231 then proceeds to step 26, wherein identifying code $ID_2$ is transmitted to handset unit 1B. Handset unit 1B stores identifying code $ID_2$ in its own RAM 133 as identifying code $ID_{1B}$, in accordance with the previously described procedure. Similarly, when handset unit 1C is mounted on base unit 2 with switch 271 still in its on position, the same identifying code $ID_2$ is read from RAM 233, transmitted to handset unit 1C, and stored therein.

Figure 8:
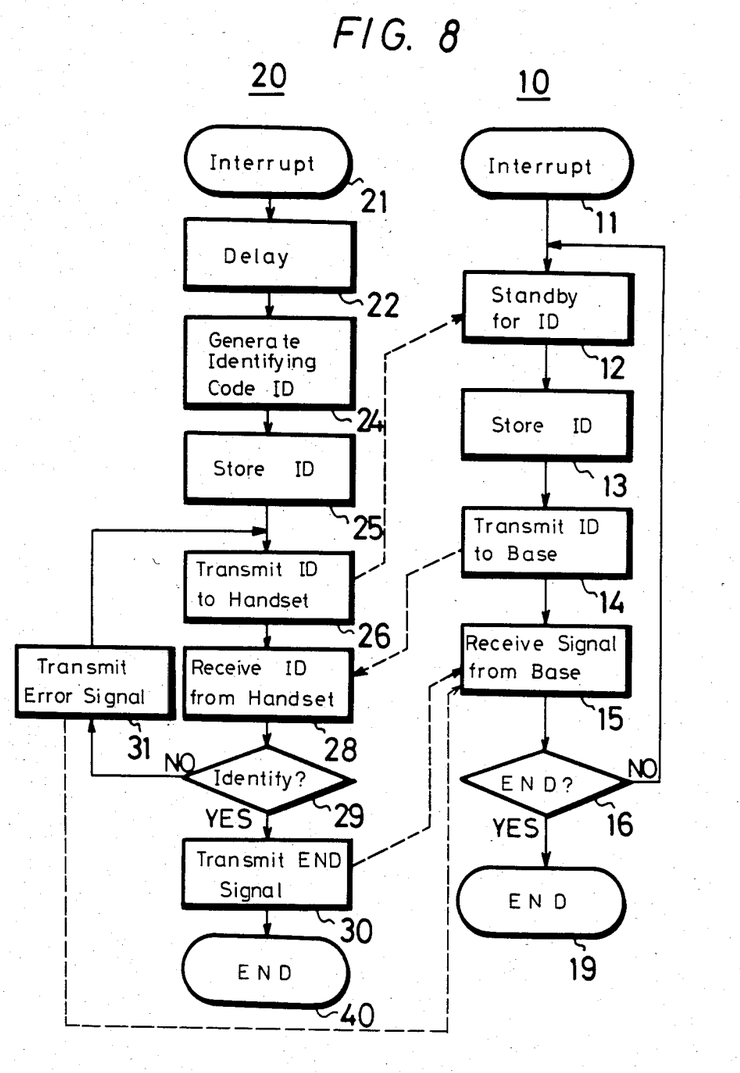
FIG. 8 is a flowchart of a third control program for the operation of the cordless telephone according to the present invention.

In accordance with another aspect of the present invention, control circuits 130,230 provide means for checking whether the correct identifying code ID has been transmitted when handset unit 1 is mounted on base unit 2. This is to guard against errors in transmission. A flowchart for this operation is illustrated in FIG. 8. Again, the steps of FIG. 8 which are the same as those in FIG. 6 bear the same reference numerals. Additional steps 28, 29, 30 and 31 have been provided in interrupt subroutine 20 for CPU 231 in base unit 2, and additional steps 14, 15 and 16 have been provided in interrupt subroutine 10 for CPU 131 in handset unit 1.

After handset unit 1 has received the transmitted identifying code $ID_2$ from base unit 2 in step 12 and stored it as identifying code $ID_1$ in RAM 133 in step 13, handset unit 1 retransmits identifying code $ID_1$ back to base unit 2 in step 14 and goes into the standby mode. Base unit 2 in step 26 receives the transmitted identifying code $ID_1$ and, in step 29, compares it to identifying code $ID_2$ now stored in RAM 233. If the two identifying codes are identical, CPU 231, in step 30, causes an END signal to be transmitted and ends interrupt subroutine in step 40. If, on the other hand, the identifying codes are not identical, CPU 231 proceeds to step 31 wherein an ERROR signal is transmitted and CPU 231 returns to step 26. Once again, in step 26 identifying code $ID_2$ is transmitted to handset unit 1 for storage as identifying code $ID_1$ and retransmission back. In step 15, handset unit 1 receives either the ERROR signal from step 31 or the END signal from step 30 and, in step 16, it determines which signal has been received. If the ERROR signal has been received, handset unit 1 returns to step 12 to standby for the retransmission of identifying code $ID_2$. If the END signal has been received, CPU 131 ends interrupt subroutine 10 in step 19. These steps are repeated until the identifying code has been properly transmitted without error and the identifying codes compared in base unit 2 are found to be identical.

Therefore, control circuits 130,230 provide means for generating an error signal when the two identifying codes are not identical and for generating an end signal when they are identical, so that the communication channel can properly be established.

The cordless telephone according to the present invention as described above in the preferred embodiments provides a highly advantageous system for communication without the risk of wiretapping. Since a new identifying code is automatically generated with each mounting of the handset unit on the base unit, this risk is significantly reduced. In fact, when the identifying code is randomly generated, the possibility of wiretapping is effectively eliminated. Because of the simplified circuitry without backup batteries, backup memories or manual code selecting switches, the cordless telephone according to the present invention may be made small, lightweight and low cost.

Having specifically described preferred embodiments of the invention, it will be apparent that the invention is not limited to such embodiments, and that many modifications and variations may be effected therein by one skilled in the art without departing from the spirit or scope of the present invention as defined in the appended claims.

I claim:

1. A cordless telephone, comprising:
    a base unit connectable to a telephone network line for receiving and transmitting message signals therethrough;
    a handset unit selectively mountable upon and separable from said base unit;
    said base unit and said handset unit being adapted to preliminarily open and establish a communication channel therebetween by the transmission and reception of electromagnetic waves;
    said base unit including identifying code generating means for automatically generating one of a plurality of identifying codes upon the mounting of said handset unit upon said base unit, first memory means for storing said generated identifying code, and means for initially transmitting said generated identifying code over said communication channel to said handset unit mounted thereupon;
    said handset unit including second memory means for storing said identifying code initially transmitted thereto;
    at least one of said base and handset units including means for transmitting over said communication channel to the other of said units the identifying code stored within the memory means of said one unit when said communication channel is preliminarily opened; and
    said other unit including means for detecting when said transmitted identifying code is identical to the identifying code stored in the memory means of said other unit and for establishing said communication channel only when identity is detected.

2. A cordless telephone according to claim 1, wherein said identifying code generating means is a random number generating means for randomly generating a random number, and said one of a plurality of identifying codes is generated in response to said random number.

3. A cordless telephone according to claim 1, wherein said handset unit includes a rechargeable battery, and means for recharging said battery when said handset unit is mounted on said base unit.

4. A cordless telephone according to claim 1, wherein said base unit and said handset unit include first and second transmitting means, respectively, for transmitting the respective stored identifying codes, and first and second detecting means, respectively, for detecting identifying codes.

5. A cordless telephone according to claim 4, wherein, upon receipt of a message signal on said telephone network line indicating an incoming call, said first transmitting means of said base unit transmits the identifying code stored in said first memory means and said second detecting means in said handset unit detects whether when said transmitted identifying code is identical to the identifying code stored in said second memory means.

6. A cordless telephone according to claim 5, wherein said handset unit includes actuable switch means having an ON position in which said handset unit is enabled to open said communication channel such that, upon actuation of said switch to said ON position, said second transmitting means of said handset unit transmits the identifying code stored in said second memory means and said first detecting means of said base unit detects whether the identifying code transmitted from the handset unit is identical to the identifying code stored in said first memory means.

7. A cordless telephone according to claim 6, wherein each of said first and second memory means includes read/write memory means for storing the respective identifying code; and each handset and base units includes control means for the respective detecting means by which the stored identifying code is read from the respective memory, the transmitted identifying code and the stored identifying code are compared, and a control signal is generated indicating the existence of identity therebetween, said cordless telephone being responsive to said control signal for establishing said communication channel.

8. A cordless telephone according to claim 7, wherein said control means includes microprocessor means.

9. A cordless telephone according to claim 8, wherein said identifying code generating means is constituted by said microprocessor means of said base unit.

10. A cordless telephone according to claim 9 wherein said identifying code generating means is a random number generating means for randomly generating a random number, and said one of a plurality of identifying codes is generated in response to said random number.

11. A cordless telephone according to claim 8, wherein said microprocessor means includes a central processing means and read only memory means for storing a control program, said central processing means being operative under said control program for detecting said identity.

12. A cordless telephone according to claim 6, wherein said handset unit includes a rechargeable battery for powering the handset unit, and means for recharging the battery when said handset unit is mounted on said base unit.

13. A cordless telephone according to claim 12, wherein said base and handset units include respective charging terminals adapted to be placed in electrical contact when said handset unit is mounted on said base unit, said base unit includes charging detection means for generating an interrupt signal when said charging terminals are in electrical contact, and said identifying code generating means generates said identifying code in response to said interrupt signal.

14. A cordless telephone according to claim 13, wherein said handset unit includes second charging detection means for generating a second interrupt signal when said charging terminals are in electrical contact, said handset unit being enabled to receive said initially transmitted identifying code in response to said second interrupt signal.

15. A cordless telephone according to claim 14, wherein said second detecting circuit includes delay means for delaying the enabling operation of said handset unit in response to said second interrupt signal for a predetermined period of time.

16. A cordless telephone according to claim 14, further comprising at least one additional handset unit, and wherein said base unit further includes means for selectively inhibiting the generation of said identifying code upon the mounting of said additional handset unit upon said base unit, and said means for initially transmitting an identifying code is operative to transmit the code previously stored in said first memory means upon said inhibiting.

17. A cordless telephone according to claim 14, wherein after said identifying code is initially transmitted to said handset unit and stored in said second memory means, said second transmitting means transmits the identifying code stored in said second memory means back to said base unit, and wherein said base unit includes means for generating an error signal when the identifying code received back is not identical to the identifying code stored in said first memory means, said means for initially transmitting being responsive to said error signal for retransmitting said generated identifying code.

18. A cordless telephone according to claim 14, wherein said identifying code generating means includes a random number generating means for randomly generating a random number, and said one of a plurality of identifying codes is generated in response to said random number.

* * * * *